US012762860B2

(12) United States Patent
Jeong et al.

(10) Patent No.: US 12,762,860 B2
(45) Date of Patent: Oct. 13, 2026

(54) DRIVING VIDEO RECORDING SYSTEM AND A CONTROLLING METHOD OF THE SAME AND A MANUFACTURING METHOD OF THE SAME

(71) Applicants: Hyundai Motor Company, Seoul (KR); Kia Corporation, Seoul (KR); Sogang University Research & Business Development Foundation, Seoul (KR)

(72) Inventors: Dong Hyuk Jeong, Hwaseong-Si (KR); Gyun Ha Kim, Incheon (KR); Seok Ju Yeom, Suwon-Si (KR); Jae Ho Kwak, Gwacheon-Si (KR); Jung Hoon Lee, Seoul (KR); Seung Hun Moon, Seoul (KR); Suk Ju Kang, Seoul (KR); Chang Ryeol Jeon, Seoul (KR)

(73) Assignees: Hyundai Motor Company, Seoul (KR); Kia Corporation, Seoul (KR); Sogang University Research & Business Development Foundation, Seoul (KR)

( * ) Notice: Subject to any disclaimer, the term of this patent is extended or adjusted under 35 U.S.C. 154(b) by 415 days.

(21) Appl. No.: 18/522,004

(22) Filed: Nov. 28, 2023

(65) Prior Publication Data

US 2025/0061709 A1 Feb. 20, 2025

(30) Foreign Application Priority Data

Aug. 14, 2023 (KR) ........................ 10-2023-0106215

(51) Int. Cl.
*G06V 20/40* (2022.01)
*G06V 10/774* (2022.01)
(Continued)

(52) U.S. Cl.
CPC ............ *G06V 20/41* (2022.01); *G06V 10/774* (2022.01); *G06V 10/82* (2022.01); *G06V 20/46* (2022.01); *G06V 20/56* (2022.01)

(58) Field of Classification Search
CPC ...... G06V 20/41; G06V 10/774; G06V 10/82; G06V 20/46; G06V 20/56; G06V 10/764;
(Continued)

(56) References Cited

U.S. PATENT DOCUMENTS

2020/0057487 A1* 2/2020 Sicconi .................. G06F 3/011
2022/0164603 A1* 5/2022 Zhou ...................... G06V 20/56
2023/0112797 A1* 4/2023 Sicconi .................. G06V 10/46
705/26.7

OTHER PUBLICATIONS

He, Kaiming, et al. “Identity mappings in deep residual networks.” (ECCV, 2016).

(Continued)

*Primary Examiner* — Allen H Nguyen
(74) *Attorney, Agent, or Firm* — MORGAN, LEWIS & BOCKIUS LLP

(57) ABSTRACT

In a driving video recording system and a manufacturing method of the same, the driving video recording system includes a camera module for monitoring the surroundings of a vehicle; then first memory for storing a video transmitted from the camera module; the second memory for storing a computer program for controlling the storage of the video; and a controller including a processor for executing the computer program, wherein the computer program includes a contamination classification deep training network model, and the processor is configured to determine whether video data obtained by the camera module through the deep-learning network model is contaminated through the execution of the computer program.

14 Claims, 6 Drawing Sheets

(51) Int. Cl.
*G06V 10/82* (2022.01)
*G06V 20/56* (2022.01)

(58) Field of Classification Search
CPC ...... G06V 10/993; G06V 10/40; G06V 10/75; G06V 20/49; G06N 3/0464; G06N 3/08; G07C 5/0866; H04N 5/77
USPC .......................................................... 382/156
See application file for complete search history.

(56) References Cited

OTHER PUBLICATIONS

Liu, Weitang et al. "Energy-based out-of-distribution detection." (NeurIPS, 2020).
Moon, Seunghun et al. "Energy-based Anomaly Detection Network with Diffusion Model for Soiling Detection in Autonomous Driving Camera Images" (IEIE, 2023).

* cited by examiner

DRIVING VIDEO RECORDING SYSTEM AND A CONTROLLING METHOD OF THE SAME AND A MANUFACTURING METHOD OF THE SAME

CROSS-REFERENCE TO RELATED APPLICATION

The present application claims priority to Korean Patent Application No. 10-2023-0106215, filed on Aug. 14, 2023, the entire contents of which is incorporated herein for all purposes by this reference.

BACKGROUND OF THE PRESENT DISCLOSURE

Field of the Present Disclosure

The present disclosure relates to a driving video recording system and a manufacturing method of the same.

Description of Related Art

The driving video recording system, for example, is a system for recording videos of driving situations of a vehicle.

To the present end, the driving video recording system essentially includes a controller, a memory for storing videos, and a camera for recording videos.

In general, the driving video recording system stores vehicle driving data at the time together with a video of a vehicle surrounding while driving and records a video according to a previously input setting when the occurrence of a set event is detected during parking.

The driving video recording system was initially called a black box and was only provided as an external type, but recently, it has already been built into a vehicle before the vehicle was released.

The built-in type is more advantageous than the external type in that it is possible to access driving data of the host vehicle and to connect with other controllers, and it is expected that the use thereof will gradually increase.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

When the camera lens is contaminated due to a cause such as a road environment, weather, etc., the scene to be recorded may be covered by the contamination, causing a problem.

When an additional sensor is provided to recognize contamination, the cost increases accordingly, and there is a problem of recognizing only a specific type of contamination.

Furthermore, there is a method of recognizing contamination by analyzing a video for a predetermined time period, but in the instant case, there is a problem in that real-time performance deteriorates and a storage space is additionally required, and thus a memory needs to be larger.

A purpose of the present disclosure is to solve at least one of these problems.

Various aspects of the present disclosure are directed to providing a driving video recording system configured for recognizing contamination in real time and a method of manufacturing the same.

Various aspects of the present disclosure are directed to providing a driving video recording system and a method of manufacturing the same, which can recognize a contaminant without additional memory.

According to an exemplary embodiment of the present disclosure, a driving video recording system includes a camera module for monitoring surroundings of a vehicle, a first memory for storing a video transmitted from the camera module, a second memory for storing a computer program for controlling storage of the video, and a controller including a processor electrically and communicatively connected to the camera, the first memory and the second memory and configured to execute the computer program, wherein the computer program includes a contamination classification deep-learning network model, and the processor is further configured to determine whether video data obtained by the camera module includes contamination data through the deep-learning network model by executing the computer program.

In at least an exemplary embodiment of the present disclosure, the processor is further configured to extract a feature value from the video data through the deep-learning network model and determine whether the video data includes the contamination data by comparing the feature value with a set threshold value.

In at least an exemplary embodiment of the present disclosure, the processor is further configured to extract a feature for image data of a single frame of the video data for the feature value.

In at least an exemplary embodiment of the present disclosure, the processor is further configured to determine a classification for the contamination data among predetermined contamination type classifications through the deep-learning network model when the processor concludes that the video data includes the contamination data.

In at least an exemplary embodiment of the present disclosure, the contamination type classifications includes at least one of a dust, a soil, an ice, or a water droplet.

In at least an exemplary embodiment of the present disclosure, the deep-learning network model has been trained by classification training with training data for each contamination type.

In at least an exemplary embodiment of the present disclosure, the deep-learning network model has been trained by distribution-based separation training with non-contamination training data after the classification.

According to an exemplary embodiment of the present disclosure, there is provided a control method of a driving video recording system including a camera module for monitoring surroundings of a vehicle, a first memory for storing the video transmitted from the camera module, a second memory for storing the computer program for controlling storage of the video, and a controller including a processor for executing the computer program, wherein the computer program includes a contamination classification deep-learning network model and the control method includes receiving video data from the camera module, and determining whether the video data includes contamination data through the deep-learning network model by executing the computer program.

In the control method according to at least an exemplary embodiment of the present disclosure, the determining of whether the video data includes the contamination data includes extracting a feature value from the video data through the deep training network model and comparing the feature value with a set threshold value to determine whether the video data includes the contamination data.

In the control method according to at least an exemplary embodiment of the present disclosure, the extracting of the feature value includes extracting a feature for image data of a single frame of the video data.

In the control method according to at least an exemplary embodiment of the present disclosure, the control method further includes determining a classification for the contamination data among predetermined contamination type classification through the deep-learning network model when the processor concludes that the video data includes the contamination data.

In the control method of at least an exemplary embodiment of the present disclosure, the contamination type classifications includes at least one of a dust, a soil, an ice, or a water droplet.

In the control method according to at least an exemplary embodiment of the present disclosure, the deep-learning network model has been trained by classification training with training data for each contamination type.

In the control method according to at least an exemplary embodiment of the present disclosure, the deep-learning network model has been trained by distribution-based separation training with non-contamination training data after the classification.

According to an exemplary embodiment of the present disclosure, there is provided a method for manufacturing a driving video recording system including a camera module for monitoring surroundings of a vehicle a first memory for storing a video transmitted from the camera module, a second memory for storing a computer program for controlling storage of the video and including a contamination classification deep-learning network model, and a controller including a processor for executing the computer program, the method including training the deep-learning network model by classification training with training data for each contamination type.

In the manufacturing method according to at least an exemplary embodiment of the present disclosure, the method further includes training the deep-learning network model by distribution-based separation training with non-contamination training data after the classification training.

In the manufacturing method according to at least an exemplary embodiment of the present disclosure, the distribution-based separation training includes extracting a plurality of first feature values for the contamination training data through the deep-learning network model, extracting a plurality of second feature values for the non-contamination training data, and determining a threshold value based on the plurality of first feature value distributions and the plurality of second feature value distributions.

In at least an exemplary embodiment of the present disclosure, the classification for each contamination type includes at least one of a dust, a soil, an ice, or a water droplet.

According to the driving video recording system and the manufacturing method thereof in an exemplary embodiment of the present disclosure, contamination recognition is possible in real time.

Furthermore, according to an exemplary embodiment of the present disclosure, it is possible to obtain a driving video recording system configured for recognizing a contaminant without additional memory.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
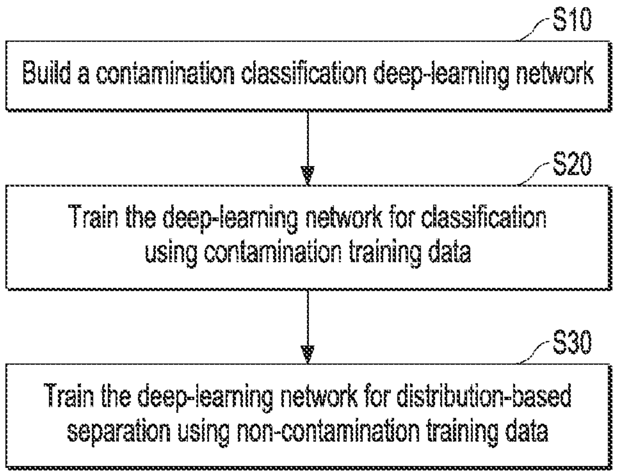
FIG. 1 is a flowchart illustrating a main manufacturing process of a driving video recording system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure is modified in various ways and has various exemplary embodiments of the present disclosure, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

The suffixes "module" and "unit" used herein are used only for name distinction between elements and should not be construed as being physiochemically divided or separated or assumed that they may be divided or separated.

Terms including ordinals such as "first," "second," and the like may be used to describe various elements, but the elements are not limited by the terms. The terms are used only for distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

The terminology used herein is for describing various exemplary embodiments only and is not intended to be limiting of the present disclosure. Singular expressions include plural expressions, unless the context clearly indicates otherwise. In the present application, it should be understood that the term "include" or "have" indicates that a feature, a number, a step, an operation, a component, a part, or a combination thereof described in the specification is present, but does not exclude the possibility of existence or addition of one or more other features, numbers, steps, operations, components, parts, or combinations thereof in advance.

Unless otherwise defined, all terms used herein, including technical or scientific terms, include the same meaning as that generally understood by those skilled in the art. It will be understood that terms, such as those defined in commonly used dictionaries, should be interpreted as including a meaning which is consistent with their meaning in the context of the relevant art and will not be interpreted in an idealized or overly formal sense unless so defined herein.

Furthermore, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, to control a function in charge, and one or more processors performing calculation, comparison, determination, and the like necessary for controlling a function in charge.

For example, a system by these names may include a communication system that communicates with another controller or sensor to control a corresponding function, a computer-readable recording medium that stores an operating system or logic command, input/output information, etc., and one or more processors that perform calculation, comparison, determination, and the like necessary for controlling the corresponding function.

Meanwhile, the processor may include a semiconductor integrated circuit and/or electronic systems that perform at least one or more of comparison, determination, and calculation to achieve a programmed function. For example, the processor may be one of a computer, a microprocessor, a CPU, an ASIC, and a circuitry (logic circuits), or a combination thereof.

Furthermore, the computer-readable recording medium (or simply referred to as a memory) includes all types of storage devices in which data which may be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk. g The recording medium may be electrically connected to the processor, and the processor may retrieve and record data from the recording medium. The recording medium and the processor may be integrated or may be physically separated.

Hereinafter, the exemplary embodiments of the present disclosure will be described in detail with reference to the accompanying drawings.

FIG. 1, FIG. 2, FIG. 3, and FIG. 4 illustrate a method of manufacturing a driving video recording system according to an exemplary embodiment of the present disclosure, which will be described in detail.

First, in S10, a deep-learning network for contamination classification is established.

The deep-learning network according to the exemplary embodiment includes a convolutional neural network (CNN)-based classification network.

For example, the deep-learning network of the exemplary embodiment includes "ResNet-18", which is a convolutional neural network composed of 18 layers.

The convolutional Neural Network (CNN)-based classification network is only an example of the exemplary embodiment, and the exemplary embodiment of the present disclosure is not necessarily limited thereto.

When the contamination classification deep-learning network is established, classification training for it is performed in S20.

Figure 2:
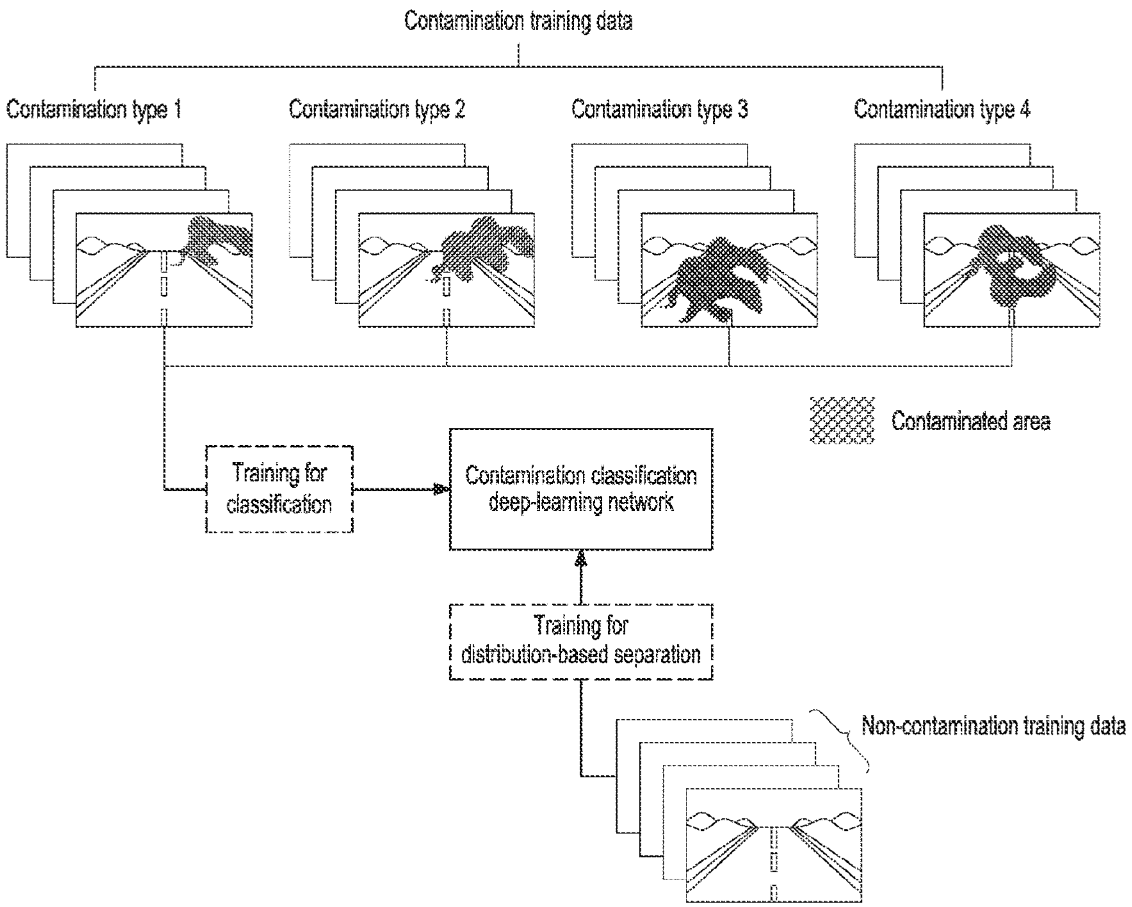
FIG. 2 illustrates a process of training a deep-learning network in the manufacturing process of a driving video recording system according to an exemplary embodiment of the present disclosure.

As shown in FIG. 2, the training data includes four contamination types, for example, dust (contamination type 1), soil (contamination type 2), ice (contamination type 3), and water droplets (contamination type 4).

A sufficient amount of training data is established for each type, and classification training for the contamination classification deep-learning network is conducted with the training data.

Figure 3:
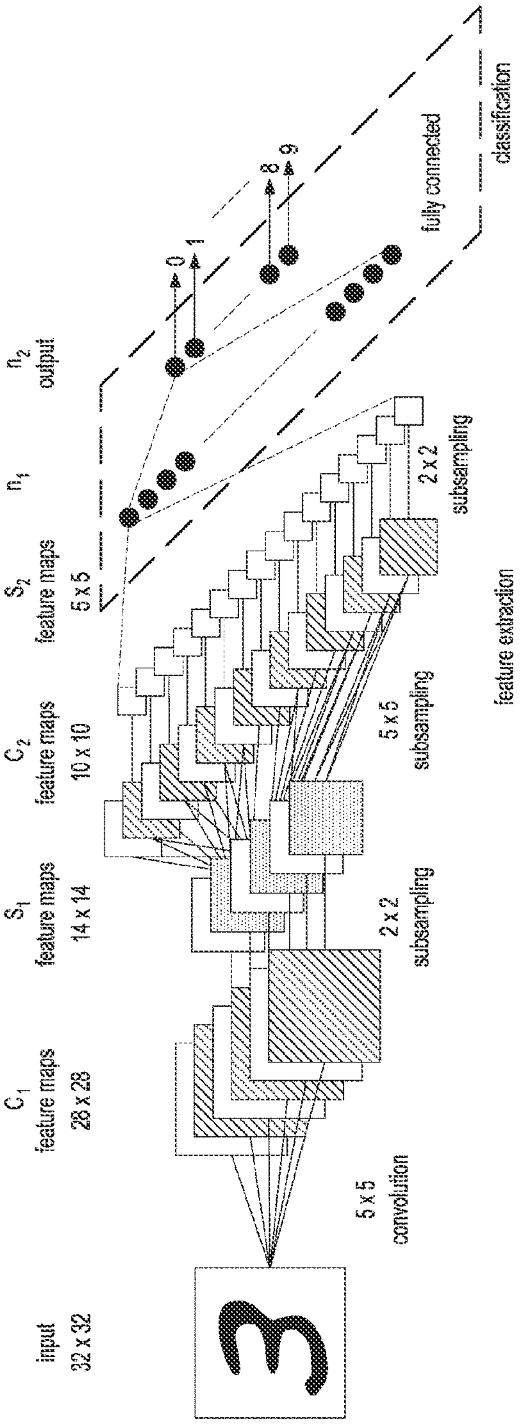
FIG. 3 illustrates a classification training process for the deep-learning network in the manufacturing process of the driving video recording system according to an exemplary embodiment of the present disclosure.

As illustrated in FIG. 3, when training data is input to the deep-learning network, probability values for four contamination types are output. The weights of the network are adjusted to minimize the loss function of the output, and the training is performed by repeating the above process with the training data for each contamination type, that is, each classification.

For example, the classification training is performed by reducing a difference between a correct answer and a prediction thereof through a cross entropy loss operation H (P, Q) as shown in Equation 1 below with respect to a probability value of a classification predicted as a result obtained by inputting training data to the deep-learning network.

$$H(P, Q) = -E_{X\sim P}[\log Q(x)] = -\sum P(x)\log Q(x) \qquad \text{Equation 1}$$

(Here, Q(x) represents a probability value for a predictive classification obtained by inputting training data to a deep-learning network, and P(x) represents one-hot encoding of a correct label)

After the classification training in S20, distribution-based separation training is performed for the deep-learning network through the non-contamination training data in S30.

Figure 4:
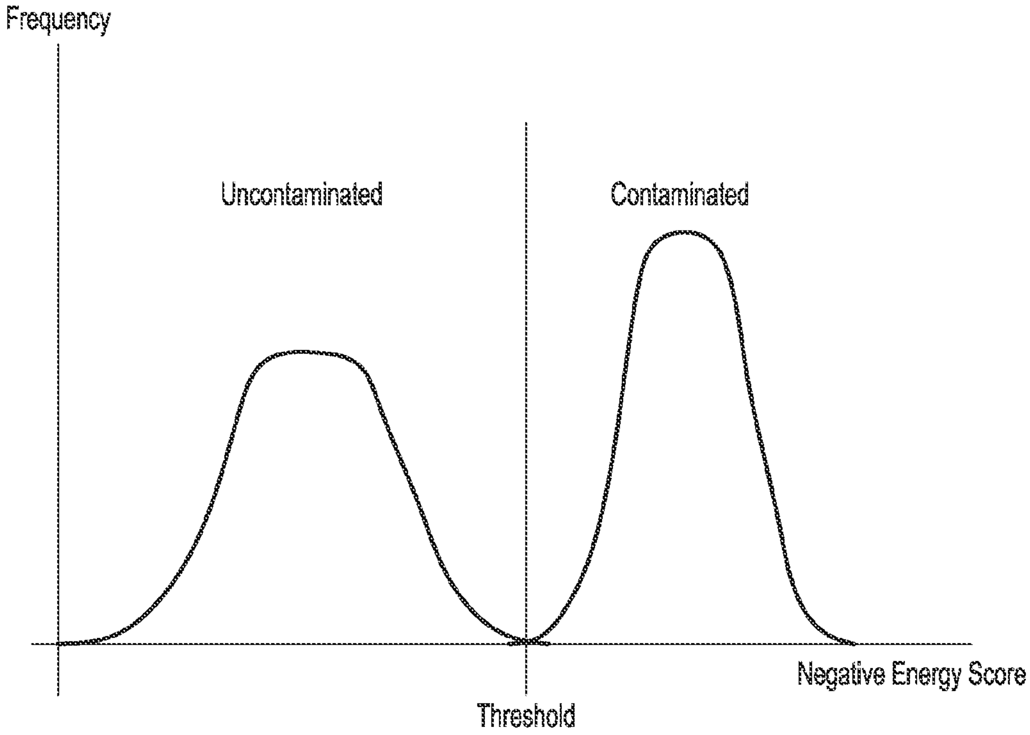
FIG. 4 is a view for explaining distribution-based separation training for the deep-learning network in the manufacturing process of the driving video recording system according to an exemplary embodiment of the present disclosure.

As shown in FIG. 4, the contamination data and the non-contamination data are different in their feature values through the deep-learning network, and the threshold value for distinguishing the contamination data and the non-contamination data may be determined.

That is, a plurality of first feature values for the contamination training data are extracted through the deep-learning network model, a plurality of second feature values for the non-contamination training data are extracted, and the threshold value is determined based on the distribution of the first feature values and the distribution of the second feature values.

Because the feature values of the non-contamination data are out-of-distribution data, as shown in FIG. 4, the feature values of the non-contamination data include a different distribution from the feature value distribution of the training data, that is, in-distribution data.

The concept of an energy score introduced in "Energy-based out-of-distribution detection" (Liu, Weitang, et al., NeurIPS, 2020) is used for distribution-based separation training, and this will be briefly described below.

When a logsumexp operation is performed using an output logits vector of the classification trained deep-learning network as an input, a maximum value among the logits is obtained in a single scalar form.

In other words, the logits including images input to and output from the network represent the degree of confidence in the prediction of the network, and the maximum logit value is returned according to the logsumexp operation, and by the present process, a high logit value is obtained with respect to the in-distribution data of training.

Because the energy score is obtained by multiplying the corresponding calculation by −1, the in-distribution data of training has a low energy score, and the out-distribution data of training has a high energy score.

As shown in FIG. 4, a negative energy score obtained by multiplying the energy score by −1 is used for intuitive visualization, and in FIG. 4, when the negative energy score is equal to or greater than a threshold value, the negative energy score is classified as in-distribution data of training, and when the negative energy score is less than the threshold value, the negative energy score may be classified as out-distribution data of training.

Because non-contamination data has various characteristics, accuracy may decrease when applied together to classification training.

In an exemplary embodiment of the present disclosure, the accuracy may be increased by performing training for separating the non-contamination data including a non-typical characteristic from the contamination data including a typical characteristic.

Furthermore, in an exemplary embodiment of the present disclosure, the training data is image data of a single frame rather than video data for a predetermined time period. Thus, because the contamination data of the video data which is obtained through the camera may be recognized at the frame level, the contamination situation may be detected virtually in real time. Furthermore, because image data of a single frame is used for contamination recognition, there is an advantage in that it is not necessary to store video data for a predetermined time period for contamination recognition.

Figure 5:
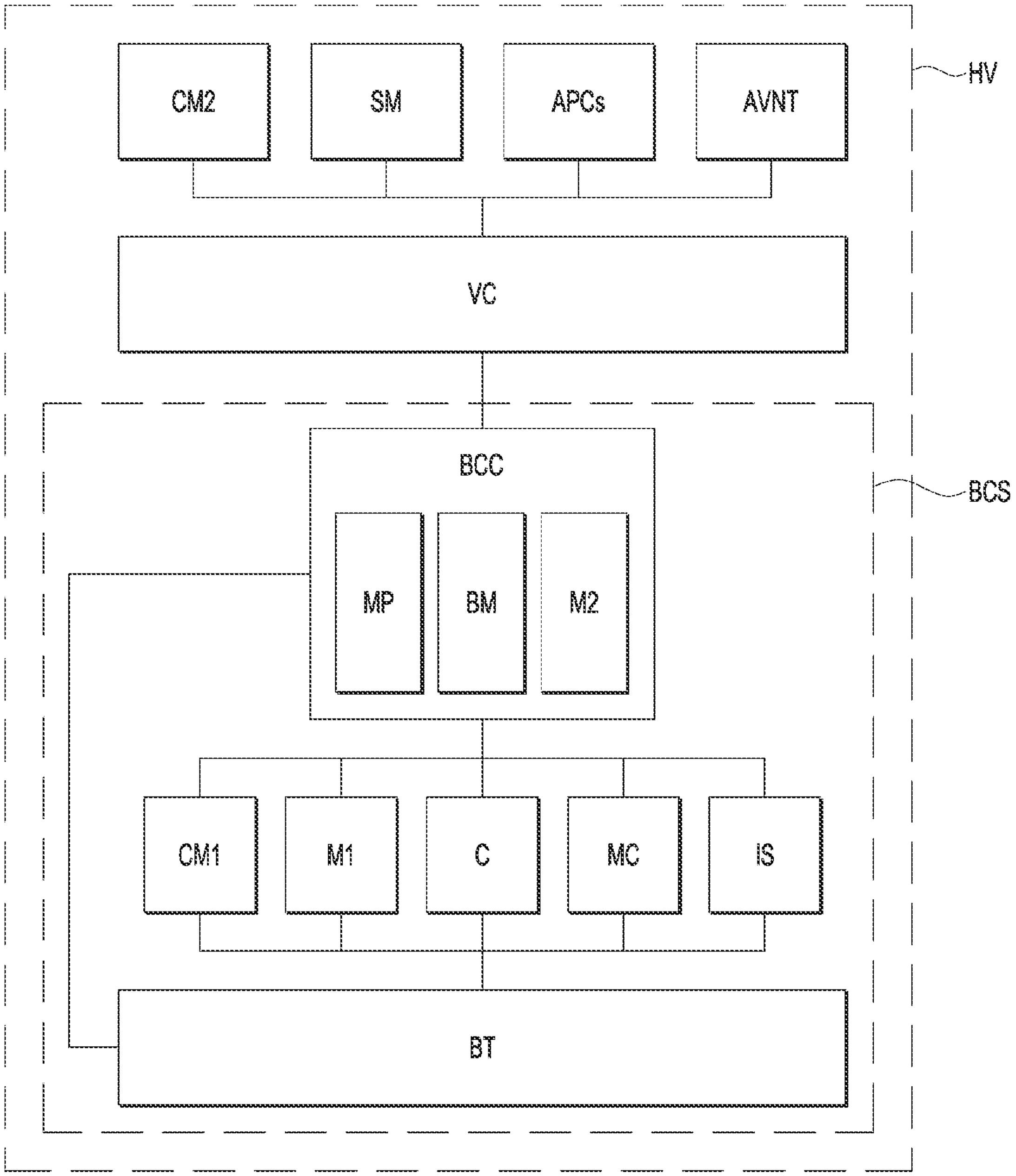
FIG. 5 is a block diagram conceptually showing a structure of the driving video recording system according to an exemplary embodiment of the present disclosure.

FIG. 5 is a block diagram conceptually illustrating a feature of a driving video recording device according to an exemplary embodiment of the present disclosure, which will be described in detail below.

Referring to FIG. 5, the built-in driving video recording device, namely, a built-in cam system BCS, according to an exemplary embodiment of the present disclosure is provided in a host vehicle HV, and includes a camera module C, a computer-readable storage medium M1, a first communication module CM1, a microphone MC, an impact sensor IS, a power auxiliary battery BT, and a built-in cam controller BCC.

The driving video recording device of the exemplary embodiment of the present disclosure is a built-in type, but it is not limited thereto.

First, the camera module C includes a front camera and a rear camera in the exemplary embodiment of the present disclosure, but it is not necessarily limited thereto. The front camera is provided to record a front area of the vehicle HV, and the rear camera is provided to record a rear area of the vehicle HV.

For example, the front camera may be provided at a position adjacent to the rear view mirror in the vehicle HV cabin of the window shield, and the rear camera may be provided on the rear window of the vehicle HV cabin or the rear bumper.

For example, the front camera and the rear cameras support any video quality of an HD, of an FHD, or of a Quad HD.

It is evident that the front camera and the rear camera do not need to include the same video quality, and a camera of an advanced driving assistance system ADAS of the host vehicle HV may be used.

Furthermore, the camera has an aperture value of F2.0 or less. F1.6 or less. If the aperture value decreases, more light is gathered, so that recording may be made brighter. Furthermore, applying image-tuning technique to minimize the noise and the loss of light, clear recording is possible even in a dark environment.

The computer-readable storage medium M1 (hereinafter, referred to as "memory") includes all kinds of storage devices in which data which may be read by a computer system is stored. For example, the memory may include at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In the exemplary embodiment of the present disclosure, the memory M1 is an external type of 64 gigabyte or a Micro SD of more thereof. For example, constant recording while driving may be performed for several hours, and constant recording while parking may be performed up to tens of hours. Furthermore, event recording according to impact detection may be performed up to several times.

The user can easily check the contents stored in the memory in a desktop computer or the like by extracting the SD card.

The information of the state of the SD card may be checked through the connected vehicle service, and the time of replacement according to the memory state can also be checked.

The first communication module CM1 is for wired or wireless communication with the exterior, and is not limited to communication protocol.

In an exemplary embodiment of the present disclosure, the first communication module CM1 includes a communication device configured for directly communicating with nearby devices, and illustratively supports Wi-Fi. The Wi-Fi module of the exemplary embodiment includes an Access Point (AP) function, and a user may easily and rapidly access the built-in cam through, for example, a smartphone.

Due to Wi-Fi, a user may easily and rapidly access the built-in cam through, for example, a smartphone.

The microphone MC supports voice recording. When the driving images of the vehicle HV is recorded, not only the images are recorded but also the voices are recorded as well.

The impact sensor IS detects an external impact, and for example, may be a one-axis or a three-axis acceleration sensor.

The impact sensor IS may be provided as the built-in cam system BCS, but it is evident that it may be used as an acceleration sensor provided in the host vehicle HV.

The signals of the impact sensor IS may be starting points for a later described event recording, and the degree of impact serving as references thereof may be set by the user.

For example, the user can select an impact detection sensitivity which is the reference for event recording when setting up the built-in cam system BCS through a display screen (e.g., a later described AVNT screen) in the vehicle HV.

For example, the impact sensitivities are classified into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12 V battery) provided in the vehicle HV.

Although the system is operated by receiving the power of the vehicle HV battery during parking as well as while driving, there may be an overconsumption problem of the vehicle HV battery, and thus, the exemplary embodiment includes the power auxiliary battery BT.

In an exemplary embodiment of the present disclosure, the built-in cam system BCS receives battery power from any one of a vehicle HV while driving from an alternator in the case of an internal combustion engine vehicle and from a lower DC/DC converter LDC in the case of an electric vehicle, while receiving power from a power auxiliary battery BT during parking.

The power auxiliary battery BT is charged and discharged depending on an operating environment of the vehicle HV and supplies optimal power for recording and OTA software update during parking.

The charging of the power auxiliary battery BT is performed by a battery of the vehicle HV (a low voltage battery or a high voltage battery of an electric vehicle), or is performed by an alternator in the case of the HV.

The built-in cam controller (BCC) is a superior controller that is configured to control other components of the built-in cam system BCS, and exchanges signals with the controller VC of the host vehicle HV and/or the second communication module (vehicle communication module) CM2, the sensor module SM, the component controllers APCs, the audio video navigation telematics AVNT, etc.

Here, the sensor module SM includes at least one of a speed sensor, of an acceleration sensor, of a vehicle position sensor (e.g., a Global Positioning System (GPS) receiver), of a steering angle sensor, of a yaw rate sensor, of a pitch sensor, and of a roll sensor, and the component controllers APCs may include at least one of a turn signal controller, a turn signal controller, a wiper controller, an ADAS system controller, and an airbag controller.

The built-in cam controller BCC is configured to control other components to perform constant recording while driving, constant recording during parking, and recording events to be recorded according to impact detection signals, etc.

During the recording, driving information of the vehicle HV is recorded as well. g Here, the vehicle HV driving information may include time, vehicle speed, gear position, turn signal information, impact detection degree (one corresponding to the above-described five steps), global positioning system (GPS) position information, etc.

The vehicle driving information may be received from the vehicle controller VC, but it is evident that it may also be directly received from a corresponding module or component of the vehicle HV. For example, a vehicle speed may be directly received from a speed sensor of the vehicle HV, a turn signal information (or turn signal information from a turn signal controller) may be directly received from a turn signal controller, and Global Positioning System (GPS) position information may be received from an AVNT or a Global Positioning System (GPS) receiver.

As described above, the event recording is performed when the event occurrence is detected during parking according to the impact detection sensitivity set by the user.

In the event recording, recording is performed from a set time before the event occurrence time to a set time after the event occurrence time, and the setting time may be selected by the user.

The AVNT is connected to the built-in cam controller BCC through the vehicle controller VC or directly, and the AVNT screen may function as a user interface for receiving various setting parameters of the built-in cam system BCS from the user.

The built-in cam controller (BCC) may transmit recorded content to an external server according to a set period, a user selection, or an event (e.g., a degree of impact detection) of a user setting.

The built-in cam controller BCC includes a memory M2 and a processor MP to perform its functions.

In an exemplary embodiment of the present disclosure, the processor MP may include a semiconductor integrated circuit and/or electronic systems that perform at least one of comparison, determination, calculation, and determination to achieve a programmed function. For example, the processor MP may be a computer, a microprocessor MC, and may be one of a processor, a CPU, an ASIC, and electronic circuits (circuitry, logic circuits), or a combination thereof.

The memory M2 may be any type of storage system that stores data which may be read by a computer system, and may include, for example, at least a flash memory type of a hard disk, of a microchip, of a card (e.g., a secure digital (SD) card or an eXtream digital (XD) card), etc., and at least memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC may be stored in the memory M2, and the processor MP reads and executes the corresponding software to perform the function of the BCC.

Furthermore, the built-in cam controller BCC includes a buffer memory BM for determination, calculation, and the like from the processor MP.

Furthermore, in an exemplary embodiment of the present disclosure, the memory M2 of the built-in cam controller BCC stores a computer program including the contamination classification deep-learning network model, and the processor MP is configured to determine whether the video data obtained by the camera module is contaminated through the execution of the computer program.

The built-in cam controller BCC may be manufactured according to the above-described manufacturing method. That is, the built-in cam controller BCC may include the deep-learning network model trained through the training of FIG. 1, FIG. 2, FIG. 3, and FIG. 4 as the computer program.

Figure 6:
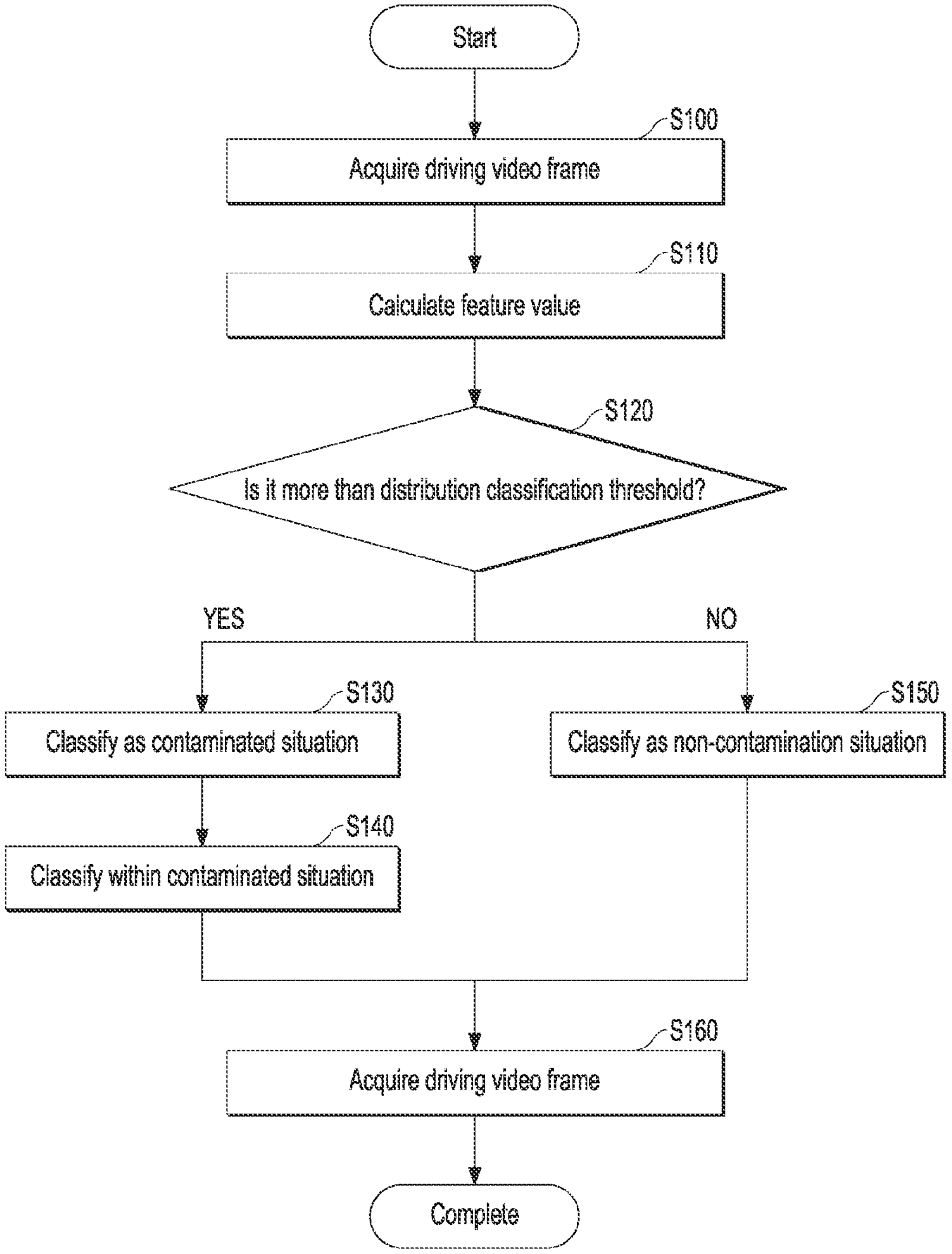
FIG. 6 is a flowchart illustrating a control method of the driving video recording system according to an exemplary embodiment of the present disclosure.

FIG. 6 shows a control method of a driving video recording system according to an exemplary embodiment of the present disclosure, which will be described in detail below.

Hereinafter, the control method of FIG. 6 will be referred to as a process in which the processor MP included in the built-in cam controller BCC of the exemplary embodiment of FIG. 5 is executed through operating of the computer program, but the exemplary embodiment of the present disclosure is not limited thereto. That is, the control method of the exemplary embodiment of the present disclosure is not limited to the driving video recording device of FIG. 5.

In S100, driving video data is obtained through the camera module C.

In S110, the processor MP is configured to determine a feature value for an image for each frame of the driving video data. To the present end, the processor MP inputs the frame-by-frame image to the deep-learning network model as input data to obtain the feature value.

Next, the processor MP compares the feature value with a set distribution classification threshold in S120.

Here, the feature value may be the above-described negative energy score. That is, the logsumexp operation is performed by receiving the logits vector output from the deep-learning network model, and the feature value may be obtained by multiplying −1.

When the feature value is equal to or greater than the threshold value (YES in S120), the processor MP is configured to determine that the contamination situation is generated in S130.

For example, assuming that the logit vectors has been output from the deep training network model as [100, 110, 20, 30], the feature value of 110 is obtained. Here, assuming that the threshold value is less than 100, the input data is determined as contamination data.

Next, in S140, the processor MP can determine classifications in regards to the contamination situation.

For example, because the logits vector [100, 110, 20, 30] is a probability of "dust" as the contamination type 1, which means that its confidence is 100, is a probability of "soil" as the contamination type 2, which means that its confidence is 110, is a probability of "ice" as the contamination type 3, which means that its confidence is 20, and is a probability of "water drop" as the contamination type 4, which means that its confidence is 30, the contamination type is classified as "soil".

The processor MP outputs the contamination classification result along with a notification about the contamination situation of the camera lens in S160.

Meanwhile, when the feature value is less than the threshold value in S120, the processor MP is configured to determine that the corresponding data is non-contamination data in S150.

Furthermore, the processor MP outputs information indicating that the camera lens is not contaminated in S160.

The processor MP may assign 1 as the flag value in case of camera lens being contaminated in S160 and otherwise may assign 0 as the flag value, outputting information on whether the camera lens is contaminated or not. In the case of contamination, a flag value indicating the contamination type classification may be further output.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A driving video recording system comprising:

a camera module for monitoring surroundings of a vehicle;

a first memory for storing a video transmitted from the camera module;

a second memory for storing a computer program for controlling storage of the video; and a controller including a processor electrically and communicatively connected to the camera, the first memory and the second memory and configured to execute the computer program, wherein the computer program includes a contamination classification deep-learning network model, and the processor is further configured to determine whether video data obtained by the camera module includes contamination data through the deep-learning network model by executing the computer program, wherein the deep-learning network model has been trained by distribution-based separation training with non-contamination training data after a classification, wherein the distribution-based separation training includes:

extracting a plurality of first feature values for contamination training data through the deep-learning network model;

extracting a plurality of second feature values for the non-contamination training data; and determining a threshold value based on plurality of first feature value distributions and plurality of second feature value distributions.

2. The driving video recording system of claim 1, wherein the processor is further configured to extract a feature value from the video data through the deep-learning network model and determine whether the video data includes the contamination data by comparing the feature value with a set threshold value.

3. The driving video recording system of claim 2, wherein the processor is further configured to extract a feature for image data of a single frame of the video data for the feature value.

4. The driving video recording system of claim 1, wherein the processor is further configured to determine the classification for the contamination data among predetermined contamination type classifications through the deep-learning network model when the processor concludes that the video data includes the contamination data.

5. The driving video recording system of claim 4, wherein the contamination type classifications includes at least one of a dust, a soil, an ice, or a water droplet.

6. The driving video recording system of claim 4, wherein the deep-learning network model has been trained by classification training with training data for each contamination type.

7. A control method of a driving video recording system including a camera module for monitoring surroundings of a vehicle, a first memory for storing a video transmitted from the camera module, a second memory for storing a computer program for controlling storage of the video, and a controller including a processor electrically and communicatively connected to the camera, the first memory and the second memory and configured for executing the computer program, wherein the computer program includes a contamination classification deep-learning network model, the control method comprising:

receiving, by the processor, video data from the camera module; and determining, by the processor, whether the video data includes contamination data through the deep-learning network model by executing the computer program, wherein the deep-learning network model has been trained by distribution-based separation training with non-contamination training data after classification, wherein the distribution-based separation training includes:

extracting a plurality of first feature values for the contamination training data through the deep-learning network model;

extracting a plurality of second feature values for the non-contamination training data; and determining a threshold value based on plurality of first feature value distributions and plurality of second feature value distributions.

8. The control method of claim 7, wherein the determining of whether the video data includes the contamination data includes:

extracting a feature value from the video data through the deep training network model; and comparing the feature value with a set threshold value to determine whether the video data includes the contamination data.

9. The control method of claim 8, wherein the extracting of the feature value includes extracting a feature for image data of a single frame of the video data.

10. The control method of claim 7, further including determining the classification for the contamination data among predetermined contamination type classification through the deep-learning network model when the processor concludes that the video data includes the contamination data.

11. The control method of claim 10, wherein the contamination type classifications includes at least one of a dust, a soil, an ice, or a water droplet.

12. The control method of claim 10, wherein the deep-learning network model has been trained by classification training with training data for each contamination type.

13. A method for manufacturing a driving video recording system including a camera module for monitoring surroundings of a vehicle a first memory for storing a video transmitted from the camera module, a second memory for storing a computer program for controlling storage of the video and including a contamination classification deep-learning network model, and a controller including a processor electrically and communicatively connected to the camera, the first memory and the second memory and configured for executing the computer program, the method comprising:

training the deep-learning network model by classification training with training data for each contamination type, wherein the method further includes training the deep-learning network model by distribution-based separation training with non-contamination training data after the classification training, wherein the distribution-based separation training includes:

extracting a plurality of first feature values for the contamination training data through the deep-learning network model;

extracting a plurality of second feature values for the non-contamination training data; and determining a threshold value based on plurality of first feature value distributions and plurality of second feature value distributions.

14. The manufacturing method of claim 13, wherein the classification for each contamination type includes at least one of a dust, a soil, an ice, or a water droplet.

* * * * *